Oct. 15, 1929.  J. E. LEWIS  1,731,386

SHOCK ABSORBER

Filed Aug. 6, 1927

INVENTOR.
John E. Lewis
BY
*[signature]*
ATTORNEY.

Patented Oct. 15, 1929

1,731,386

UNITED STATES PATENT OFFICE

JOHN E. LEWIS, OF PASADENA, CALIFORNIA

SHOCK ABSORBER

Application filed August 6, 1927. Serial No. 211,193.

My invention relates to a device adapted to be connected between two members which are movable relative to each other, said device being designed to yieldingly resist said movement, whereby to absorb any shock or sudden movement of one of said members toward the other.

To this end my device is particularly well adapted for connection with the body portion of an automobile or other vehicle and to the running gear thereof, whereby sudden movement of the body relative to the running gear is yieldingly controlled. It can also be used to connect a bumper to the front or rear portion of a vehicle so that movement of the bumper toward the vehicle will be frictionally resisted. I also provide means for regulating the frictional engagement between the members of said device, said device being so constructed and arranged that the connecting members thereof, when moved in one direction relative to each other, will increase the frictional engagement between said members, and when moved in the opposite direction, will tend to decrease said frictional contact in said device.

Figure 1:
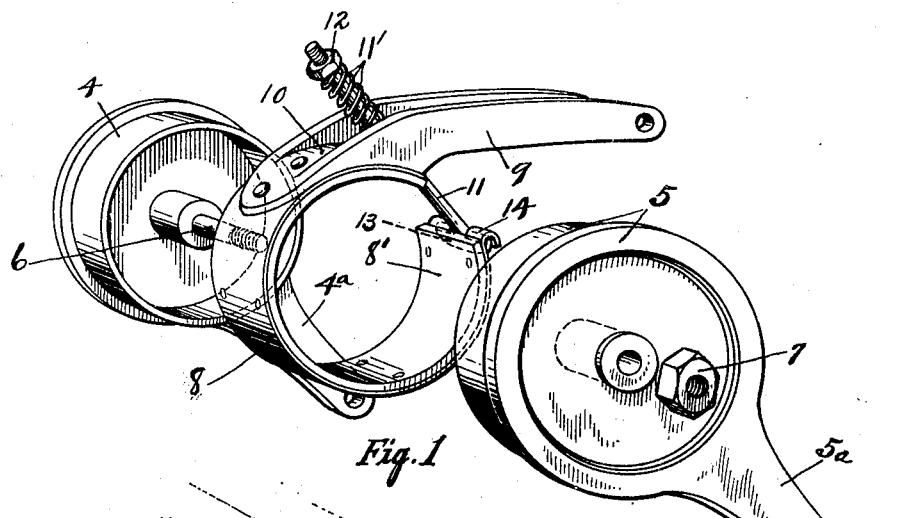
Figure 2:
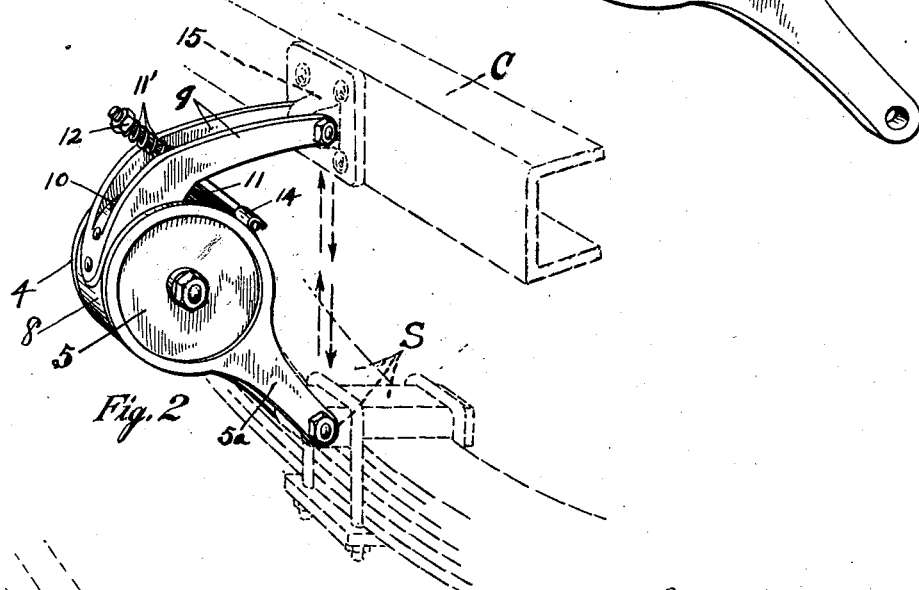
Figure 3:
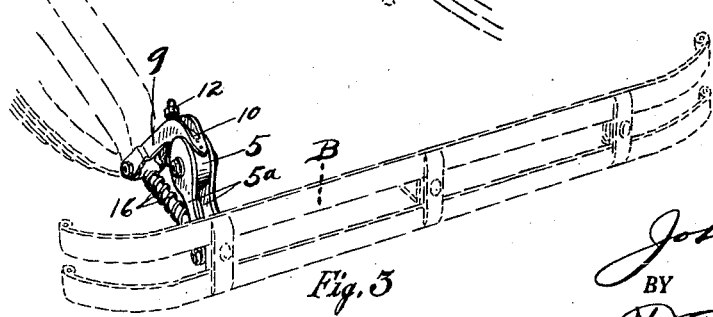

In order to explain my invention more fully, I have illustrated the same on the accompanying sheet of drawings, in which Figure 1 is a view in perspective of the various parts of one embodiment of my invention in separated relationship;

Figure 2 is a perspective view of my invention as assembled and attached to the body and running gear, or spring of an automobile; and Figure 3 is a view illustrating how my invention can be used for supporting a bumper on the front of an automobile.

Referring now in detail to the drawings, my invention as here illustrated, comprises two drum elements, 4 and 5, each having an arm projecting from one side thereof and designated 4ª and 5ª, said drum elements being preferably the counterparts of each other and adapted to be connected with their open sides meeting and secured by means of a bolt 6 and nut 7. A friction band 8, fits around the drum elements 4 and 5 when they are placed together, said friction band having an arm 9 secured thereto and projecting from one side, said arm being shown in two portions, connected at their attached end by an integral web 10, through which extends a bolt 11, provided with a coiled spring 11', and a nut 12, at one end, and at its opposite end connected with the free end of said friction band 8, as at 13, said bolt having a T-head and fitting into two hook portions, as 14, on said band.

It will be understood that the tightening of the nut 12, on said bolt, draws the free end of said friction band so as to tighten the frictional contact or engagement with the drum elements 4 and 5, yieldingly holding said band in frictional engagement around said drum elements.

When said device is to be used as a shock absorber for automobiles or other vehicles and is to be connected between the body and the running gear, one arm can be connected, as by means of a bracket 15, or other suitable fastening means, to the chassis C, and the other arm is fastened to the running gear or spring, as at S. When said chassis C is moved toward the spring S, the arms 9 and 5ª of the device are moved toward each other, said drum elements turning in a direction which tends to tighten the band element around the drum elements, or to move the free end of the band element toward the arm 9, thus operating to increase the frictional engagement of the band around the drum. When said arms 9 and 5ª are moved apart, or away from each other, the tendency is to unwind said band element, so to speak, or to move it away from the arm 9, and thus slightly reduce the friction between the band and the drum as regulated by the coiled spring 11'. It will be understood, of course, that said friction band is suitably lined as is a brake band, said lining being designated 8', and being of any suitable material.

In Fig. 3, I have shown the device used for supporting a bumper B, the arm 5ª being attached to the bumper, while the arm 9, is attached to the end of the chassis C, as indicated. Pressure or shock against the bumper moves the arm 5ª toward the arm 9, as before, with the same result, that is, increased frictional engagement of the band with the drum element. In this use, I provide an expanding spring 16, operating to normally return said arms 5ª and 9 to their normal, relative positions. This spring also resists the movement of the arms toward each other, as will be clear from the showing made.

Thus I have provided a friction shock absorber adapted to frictionally resist movement of two members in one direction relative to each other and to permit the return of said members to normal positions, and while I have shown and described one embodiment of my invention, and illustrated two different uses, I am aware that changes in details of construction and arrangement can be made without departing from the spirit thereof, and I do not, therefore, limit my invention to the showing made, except as I may be limited by the hereto appended claim.

I claim:

In a device of the character referred to, in combination, a friction band one end of which is provided with an arm projecting therefrom and the other end of which is provided with a bolt extended through said arm near its juncture with said band, a coiled spring on said bolt operating to yieldingly draw the two ends of said band together, two cup-like drums inserted into the opposite sides of said friction band with their open ends facing each other and their outer closed ends having annular flanges abutting against the opposite edges of said band, a bolt connecting said drums axially together within said band, and an arm on each of said drums projecting together for co-operation with the arm on said band, substantially as shown and described.

Signed at Pasadena, Los Angeles County, California, this 29th day of July, 1927.

JOHN E. LEWIS.